United States Patent [19]

Iizuka

[11] Patent Number: 5,748,354
[45] Date of Patent: May 5, 1998

[54] REFLECTION-TYPE SCANNING OPTICAL SYSTEM

[75] Inventor: Takashi Iizuka, Tokyo, Japan

[73] Assignee: Asahi Kogaku Kogyo Kabushiki Kaisha, Tokyo, Japan

[21] Appl. No.: 790,532

[22] Filed: Jan. 30, 1997

[30] Foreign Application Priority Data

Feb. 5, 1996 [JP] Japan ................................. 8-042059

[51] Int. Cl.⁶ ................................................ G02B 26/08
[52] U.S. Cl. ......................... 359/205; 359/207; 359/208; 359/216; 359/217
[58] Field of Search .............................. 359/205–208, 359/216–219; 347/258–261

[56] References Cited

U.S. PATENT DOCUMENTS

| | | | |
|---|---|---|---|
| 5,200,850 | 4/1993 | Iizuka et al. | 359/206 |
| 5,546,215 | 8/1996 | Ota | 359/208 |
| 5,557,448 | 9/1996 | Endo et al. | 359/208 |
| 5,572,353 | 11/1996 | Iizuka et al. | 359/207 |
| 5,604,622 | 2/1997 | Iizuka et al. | 359/207 |
| 5,621,562 | 4/1997 | Hama | 359/208 |

*Primary Examiner*—James Phan
*Attorney, Agent, or Firm*—Greenblum & Bernstein, P.L.C.

[57] ABSTRACT

A reflection type scanning optical device includes a light source; a deflector for deflecting and scanning the light beam emitted from the light source; a first imaging optical system, between the light source and the deflector, that has a positive power in an auxiliary scanning direction for converging a light beam from the light source to form a linear image at the position between the deflector and the imaging surface; and a second imaging optical system that converges the light beam deflected by the deflector to form a beam spot on the imaging surface, the second imaging optical system including a curved surface mirror having a positive power mainly in a main scanning direction and an anamorphic lens having a positive power mainly in the auxiliary scanning direction, wherein the light beam from the deflector is reflected by the curved surface mirror and then passes the anamorphic lens.

7 Claims, 3 Drawing Sheets

REFLECTION-TYPE SCANNING OPTICAL SYSTEM

BACKGROUND OF THE INVENTION

The present invention relates to a scanning optical system used for a laser beam printer, a laser facsimile machine, or the like. In particular, the present invention relates to a scanning optical system including, a curved mirror (i.e., a reflection-type scanning optical system).

U.S. Pat. No. 5,572,353 discloses a reflection-type scanning optical system. The optical system disclosed includes a semiconductor laser, and a first imaging optical system that includes an aperture and a cylindrical lens having a positive power in an auxiliary scanning direction. The optical system disclosed further includes a polygonal mirror to deflect the laser beam from the cylindrical lens, and a second imaging optical system that includes a cylindrical mirror having a positive power in a main scanning direction and a toric lens having a positive power in the auxiliary scanning direction. The laser beam emitted from the semiconductor laser forms a linear image at a point between the cylindrical lens and the polygon mirror by means of the cylindrical lens. The linear image is, for example, a linearly spread image or a line focus that extends in the main scanning direction. The laser beam deflected by the polygon mirror is converged by the second imaging optical system to form a scanning beam spot on an imaging surface such as a photoconductive drum surface.

The refractive power of the second imaging optical system in the auxiliary scanning direction is offset from the center of the second imaging optical system to the image surface side, because the optical power in the auxiliary scanning direction is distributed more strongly to the toric lens located at the imaging surface side. That is, the principal points of the second imaging optical system in the auxiliary scanning direction are offset from the center of the second imaging optical system to the imaging surface side Additionally, the power of the cylindrical lens is determined so that the linear image is formed between the cylindrical lens and the polygon mirror. Since the linear image is an object point of the second imaging optical system in the auxiliary scanning direction, an object distance (a distance from an object point to a front principal point) of the second imaging optical system is relatively longer in a case where the front principal point is located at the center of the second imaging optical system.

Since the incident laser beam to the second imaging optical system is a divergent beam in the auxiliary scanning direction, if the object distance in the auxiliary scanning direction is large, the diameter of the laser beam in the auxiliary scanning direction at the front principal point is large and the beam spot size on the imaging surface becomes too small.

In order to keep a predetermined beam spot size, the diameter of the laser beam should be small. Therefore, an f-number of the first imaging optical system should be large in the auxiliary scanning direction to reduce the divergent angle.

However, if the focal length of the cylindrical lens increases to increase the f-number of the first imaging optical system while keeping the position of the linear image, the size of the optical system enlarges, because the distance between the cylindrical lens and the polygon mirror is increased. Therefore, the diameter of the aperture is set at a smaller value to increase the f-number of the first imaging optical system. However, such the setting of aperture lowers the energy availability of the laser beam from the semiconductor laser.

SUMMARY OF THE INVENTION

It is therefore an object of the present invention to provide an improved reflection type scanning optical system, in which the power of the second imaging optical system in the auxiliary scanning direction is offset from center toward the imaging surface side, that allows keeping a predetermined beam spot size without enlarging the size of the optical system and without decreasing the energy availability.

In order to achieve the object of the invention, a reflection type scanning optical system includes a light source; a deflector for deflecting and scanning the light beam emitted from the light source; a first imaging optical system, between the light source and the deflector, that has a positive power in an auxiliary scanning direction for converging a light beam from the light source to form a linear image at the position between said deflector and said imaging surface; and a second imaging optical system that converges the light beam deflected by the deflector to form a beam spot on the imaging surface, the second imaging optical system including a curved surface mirror having a positive power mainly in a main scanning direction and an anamorphic lens having a positive power mainly in the auxiliary scanning direction, wherein the light beam from the deflector is reflected by the curved surface mirror and then passes the anamorphic lens.

The deflector may comprise a polygon mirror, which has a plurality of reflecting surfaces, that is rotated for scanning the light beam. The polygon mirror and the curved surface mirror may be arranged such that the incident light beams and the reflected light beams are separated in the auxiliary scanning direction.

The first imaging optical system may include a cylindrical lens that has a positive power only in the auxiliary scanning direction. And the power of the cylindrical lens is preferably determined to satisfy the condition:

$$0.1P < L < 0.9P$$

where P is a distance between the reflecting surface of the polygon mirror and the curved surface mirror along an optical axis, and L is a distance between the reflecting surface of the polygon mirror and the linear image.

The first imaging optical system may further include an aperture that limits the transmitting area of the light beam.

DETAILED DESCRIPTION OF THE PREFERRED EMBODIMENTS

An embodiment of a reflection-type scanning optical system according to the invention is hereinafter described. The scanning optical system is, for example, included in a laser scanning unit used in a laser beam printer to form a scanning laser beam spot. The laser beam (and laser beam spot) is modulated by a drawing signal to form a latent image on a surface of a photoconductive drum.

Figure 1:
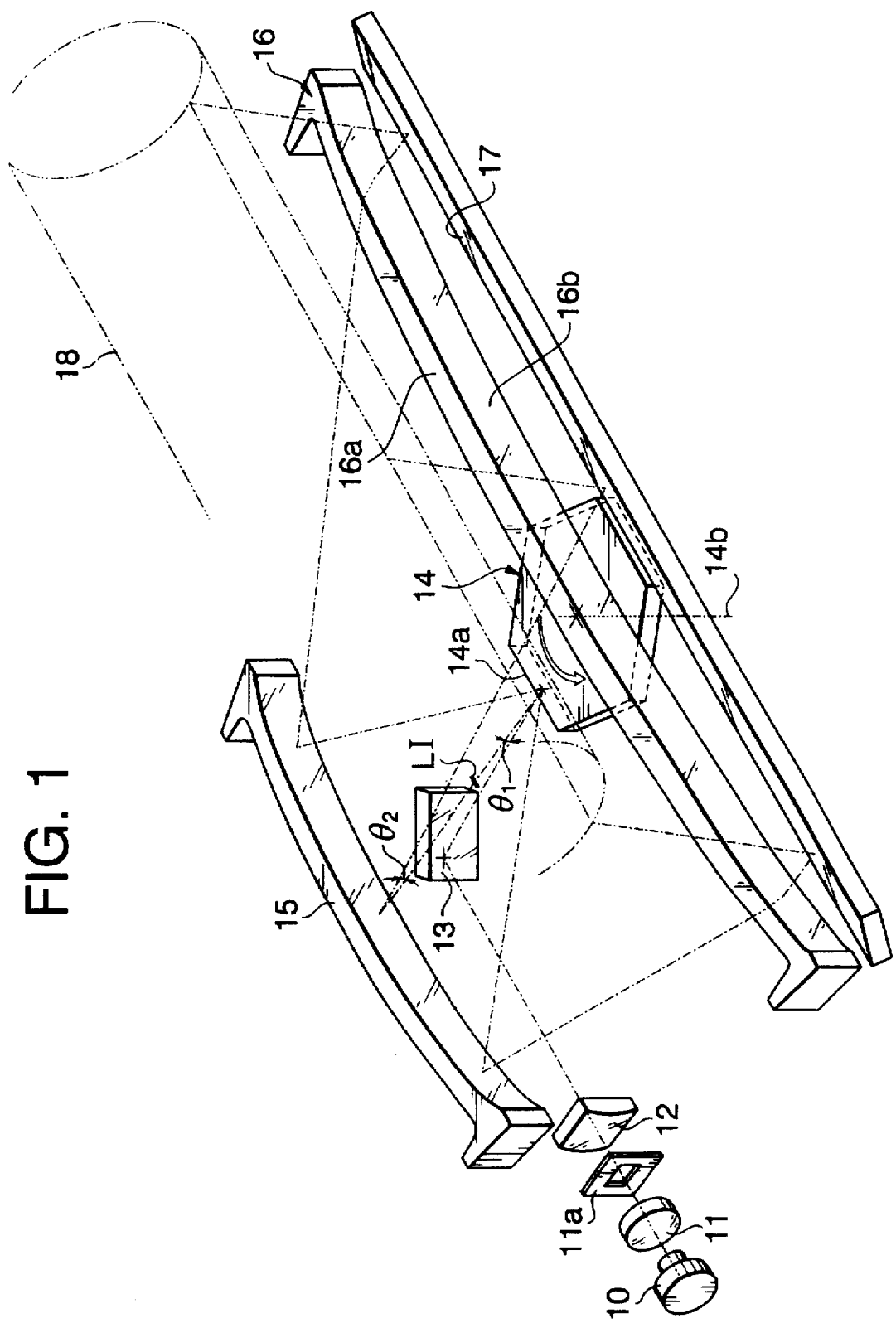
FIG. 1 is a perspective view showing a reflection-type scanning optical system according to an embodiment of the present invention.

As shown in FIG. 1, an embodiment of a scanning optical system is arranged such that a diverging light beam generated from a semiconductor laser 10 (laser source) is collimated by means of a collimator lens 11. The collimated laser beam then passes through an aperture 11a, and then a cylindrical lens 12 for converging the beam in only the auxiliary scanning direction to form a linear image LI. A first imaging optical system, which forms the linear image LI, consists of the cylindrical lens 12 and the aperture 11a that is located between the collimator lens 11 and the cylindrical lens 12. The aperture 11a is provided with a rectangular opening having longer sides parallel to the main scanning direction. The converged beam is then reflected by a flat mirror 13 at a substantially right angle, and is incident to a reflecting surface 14a of a polygon mirror 14. A principal ray of the laser beam incident to the polygon mirror 14 is included in a plane that also includes a rotation axis of the polygon mirror 14.

The polygonal mirror 14 rotates at a high speed, thereby deflecting the laser beam. The deflected laser beam is then reflected by a curved surface mirror 15 back toward the polygon mirror side (but either above or below the polygon mirror 14) and transmits through an anamorphic lens 16. The laser beam transmitted through the anamorphic lens 16 is reflected by a fold-over mirror 17 and forms a beam spot on a surface of a photoconductive drum 18 (i.e., an imaging surface). A second imaging optical system, which forms a beam spot, consists of the curved surface mirror 15 and the anamorphic lens 16. The power of the second imaging optical system in the main scanning direction is mainly distributed (i.e., distributed more) to the curved surface mirror, and the power in the auxiliary scanning direction is mainly distributed (i.e., distributed more) to the anamorphic lens 16. The beam spot scans along a main scanning direction parallel to a generatrix of the photoconductive drum 18 as the polygon mirror 14 rotates.

In this specification, "an optical axis of an optical system" is defined as an axis that coincides with the principal ray when the spot formed on the imaging surface strikes the center of the scanning area. The "main scanning direction" is defined as a direction in a plane perpendicular to the optical axis that corresponds to the scanning direction of the spot on the imaging surface, and "the auxiliary scanning direction" is defined as a direction perpendicular to the main scanning direction in a plane perpendicular to the optical axis.

The cylindrical lens 12 includes a cylindrical surface having a positive power in the auxiliary scanning direction at the collimator lens 11 side, and a flat surface at the flat mirror 13 side. The power (focal length) of the cylindrical lens 12 is determined so that the linear image LI is formed between the reflecting surface 14a of the polygon mirror 14 and the imaging surface. Particularly, in this embodiment, the linear image LI is formed between the reflecting surface 14a and the curved mirror 15. Thus, the focal length of the cylindrical lens 12 is increased, and is relatively large when compared with a conventional cylindrical lens, without the need to increase the distance between the cylindrical lens 12 and the polygon mirror 14. Thus, the f-number of the first imaging optical system in the auxiliary scanning direction can be maintained without decreasing the diameter of the aperture 11a.

Also, since the linear image LI (an object point of the second imaging optical system) is formed between the polygon mirror 14 and the imaging surface, the object distance of the second imaging optical system is shorter than that of the conventional system. Thus, the diameter of the laser beam at the front principal point of the second imaging optical system will be relatively small if the same divergent angle used for the conventional system is used. In order to keep the same diameter of the laser beam and thus keep the predetermined beam spot size, the diameter of the opening of the aperture 11a in the auxiliary scanning direction must be made larger than that of the conventional system so that the diameter of the laser beam will be the same as the diameter of the laser beam in the conventional system. Such a setting of the aperture 11a enables a decrease in the required energy output of the laser beam emitted from the semiconductor laser 10, while keeping the same energy in the beam spot on the imaging surface.

The position of the linear image LI preferably satisfies the condition:

$$0.1P < L < 0.9P$$

where P is a distance along the optical axis between the reflecting surface 14a of the polygon mirror 14 and the curved surface mirror, and L is a distance between the reflecting surface 14a and the linear image LI.

If L is smaller than 0.1P, the magnification of the second imaging optical system in the auxiliary scanning direction is too small, and the energy availability will be lower. If L is larger than 0.9P, the distance between the linear image and the curved surface mirror is too small, such that a sectional area of the light beam on the curved surface mirror is smaller, and thus, the quality of the light beam is liable to be affected by dirt or flaws on the reflecting surface 14a. For example, if dirt or a flaw is on the reflecting surface 14a, the reflected light beam may be diffused and the distribution of the light quantity in the beam spot will be irregular.

The curved surface mirror 15 has a plastic body coated by a reflective coating. The anamorphic lens 16 is also made from plastics. If a lens is used in place of the curved surface mirror 15, it is preferable to use a plastic lens from a cost standpoint. However, since the refractive index of a plastic material varies depend on the moisture content, the refractive power of a plastic lens varies as the moisture content varies. In particular, a variation of the refractive power significantly affects deviations of the imaging point in a high magnification optical system such as that in the embodiment. The use of a plastic mirror rather than a lens overcomes the problem of the variation in the refractive index according to the moisture content.

Since a magnification of an optical system is represented by dividing the image distance (a distance from a rear principal point to an imaging point) by the object distance, the magnification of the second imaging optical system in the auxiliary scanning direction is relatively large in comparison with the magnification of a second imaging optical system in a conventional system.

The mirror surface of the curved surface mirror 15 and the incident side surface 16a of the anamorphic lens 16 are aspherical, and rotationally symmetric about the optical axis. The exit side surface 16b of the anamorphic lens 16, however, is rotationally asymmetric about the optical axis. The shape of the exit side surface 16b is a locus formed from the rotation of a curved, non-circular line about an axis in the main scanning direction. The anamorphic lens 16 is arranged such that the optical axis of the anamorphic lens 16 is offset downward from the optical axis of the optical system, as viewed in FIG. 1.

The scanning laser beam is deflected in the auxiliary scanning direction by the polygonal mirror 14 at a first separation angle $\theta_1$, and is subsequently again deflected in the auxiliary scanning direction by the curved surface mirror 15, and directed to the anamorphic lens 16 above the polygonal mirror 14.

The first separation angle $\theta_1$ is set to be as small as possible, but having sufficient separation from the laser supply plane (containing the flat mirror 13 and beam therefrom) to prevent the flat mirror 13 from interfering with the scanning beam. The second separation angle $\theta_2$ is as small as possible but having sufficient separation from the polygonal mirror 14 to prevent the transmission of oscillations from the rotating polygonal mirror 14 to the anamorphic lens 16.

Since the anamorphic lens 16 is arranged to be eccentric, or offset, in the auxiliary scanning direction, skew distortion, (generated since the laser beam is incident on the reflection surfaces of the polygonal mirror 14 at an angle in the auxiliary scanning direction) is corrected. That is, since the laser beam incident on the anamorphic lens 14 scans in accordance with a locus offset from the revolution axis of the incident surface of the anamorphic lens 16 (coincident with the optical axis of the anamorphic lens 16), the anamorphic lens 16 bends the laser beam asymmetrically about the optical axis in the auxiliary scanning direction. With this function, the skew distortion of the laser beam can be corrected.

The curved surface mirror 15 is therefore inclined towards the polygonal mirror 14 to reduce the deflection amount in the auxiliary scanning direction. Furthermore, as the laser beam is incident to the polygonal mirror 14 with an inclination causing curvature of the scanning lines, by inclining the curved mirror 15 in the direction opposite that of the polygonal mirror 14, a canceling curvature is generated, so that the curvatures are substantially canceled out.

The flat mirror 13 reflects the laser beam from the cylindrical lens 12 at a substantially right angle towards the rotary axis 14b of the polygonal mirror 14. The laser beam is directed towards the rotary axis 14b of the polygonal mirror 14 in order to increase the angular range through which scanning is possible. Thus, for example, for a given size of the polygonal mirror 14, the scanning range will be larger than in a conventional arrangement. Conversely, given a required scanning range, the size of the polygonal mirror 14 can be smaller. Furthermore, with this arrangement, optical field curvature occurs symmetrically about the optical axis, so that field curvature correction is easily accomplished.

Figure 2:
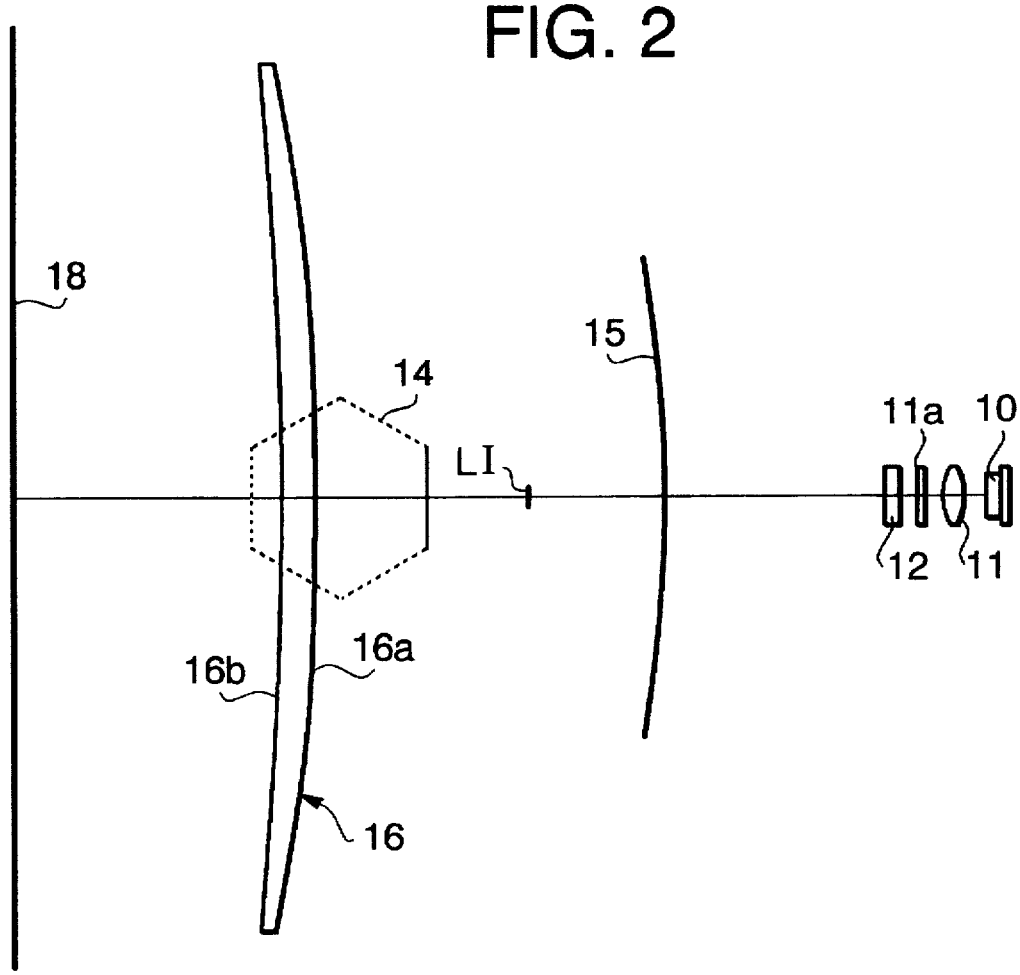
FIG. 2 is a plan view of the arrangement of the optical system shown in FIG. 1, showing the main scanning direction.
Figure 3:
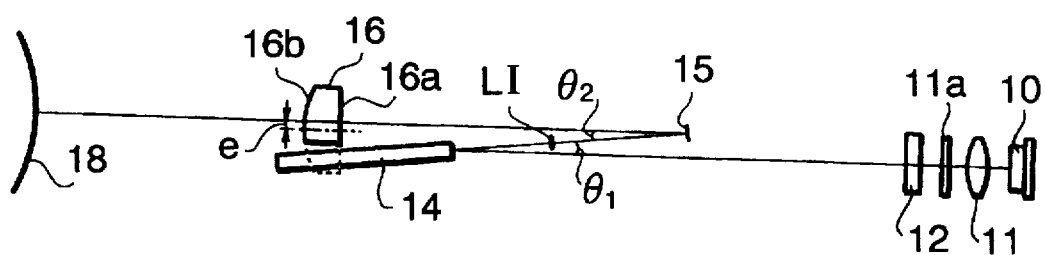
FIG. 3 is a side view of the arrangement of the optical system shown in FIG. 1, showing the auxiliary scanning direction.

FIGS. 2 and 3 show the arrangement of the scanning optical system according to the embodiment. In FIGS. 2 and 3, the arrangements of the elements are shown in the main scanning direction and in the auxiliary scanning direction respectively, and the optical paths are expanded (i.e., "unfolded") such that the first flat mirror 13 and the fold-over mirror 17 are not shown. An example construction of the embodiment is described in TABLE 1. In the table, θ1 and θ2 denote the separation angles, e denotes the off-center amount of the optical axis of the anamorphic lens from the optical axis of the whole system (a minus sign represents off-centered to light source side), ry denotes a radius of curvature in the main scanning direction, rz denotes a radius of curvature in the auxiliary scanning direction (a blank means a rotationally symmetric surface, i.e., rz=ry), d denotes a distance between the surfaces along the optical axis and n780 denotes the refractive index for 780 nm wavelength light.

Further, counting from the laser source side, the surface numbers 1 and 2 represent the cylindrical lens 12, the surface number 3 is the polygonal mirror 4, the surface number 4 represents the curved surface mirror 15, and the surface numbers 5 and 6 represent the anamorphic lens 16.

The curve of the curved surface mirror 15 and the incident surface 16a of the anamorphic lens 16 are rotationally symmetric aspherical surfaces that are expressed by the following equation:

$$X = \frac{CY^2}{1+\sqrt{1-(1+K)C^2Y^2}} + A4Y^4 + A6Y^6 + A8Y^8$$

X is a SAG, that is, a height of a curve measured from the tangential plane at the point where the height from the optical axis is Y. C is a curvature (1/r) of the top of the surface, K is a conic constant and A4, A6 and A8 are aspherical surface coefficients of fourth, sixth and eighth orders.

The exit side surface 16b of the anamorphic lens 16 is defined as a locus formed by rotating a non-circular arc about an axis in the main scanning direction. The non-circular arc is also defined by the above-mentioned equation. The exit side surface 16b is defined by rotating the non-circular arc about a rotation axis in the main scanning direction. The intersecting point between the rotation axis and the optical axis is located toward the curved surface mirror 15 side of the intersecting point between the non circular arc and the optical axis. In this example, the distance between these intersecting points is 18.551 mm.

These constants and coefficients are shown in TABLE 2. The radiuses of curvature of the fourth, fifth, and sixth surfaces in TABLE 1 are the values at the vertices.

TABLE 1

$\theta1 = 3.5$ deg. $\theta2 = 5.0$ deg. $e = 1.29$ mm

| Surface number | ry | rz | d | n780 |
| --- | --- | --- | --- | --- |
| 1 | ∞ | 61.286 | 4.000 | 1.51072 |
| 2 | ∞ | — | 95.000 | |
| 3 | ∞ | — | 50.000 | |
| 4 | −261.949 | — | 73.379 | |
| 5 | 1723.850 | — | 6.000 | 1.48617 |
| 6 | 529.136 | −18.551 | 55.392 | |

TABLE 2

| Fourth surface | Fifth surface | Sixth surface (Main scanning) |
| --- | --- | --- |
| K = 4.4425 | K = 4.0977 | K = 0.0148 |
| A4 = 1.24534 * $10^{-7}$ | A4 = 8.67845 * $10^{-8}$ | A4 = −1.04900 * $10^{-7}$ |
| A6 = −1.00484 * $10^{-11}$ | A6 = −6.67553 * $10^{-13}$ | A6 = 8.63261 * $10^{-12}$ |
| A8 = 6.92325 * $10^{-16}$ | A8 = −5.47529 * $10^{-17}$ | A8 = −2.62647 * $10^{-16}$ |

In this example, the distance from the reflecting surface 14a of the polygon mirror 14 to the linear image LI is 22.35 mm. Since the distance P between the reflecting surface 14a and the curved surface mirror 15 along the optical axis is equal to 50.00 mm, the relationship is L=0.477P, and the condition 0.1P<L<0.9P is therefore satisfied.

Figure 4A:
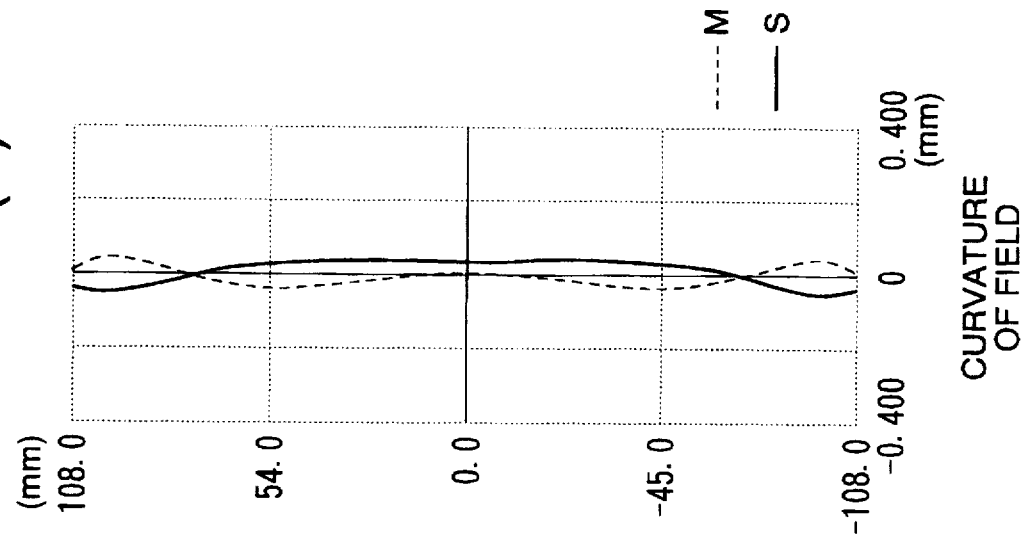
FIGS. 4(A), 4(B) show linearity error and curvature of field of the scanning optical system according to the embodiment, respectively.
Figure 4B:
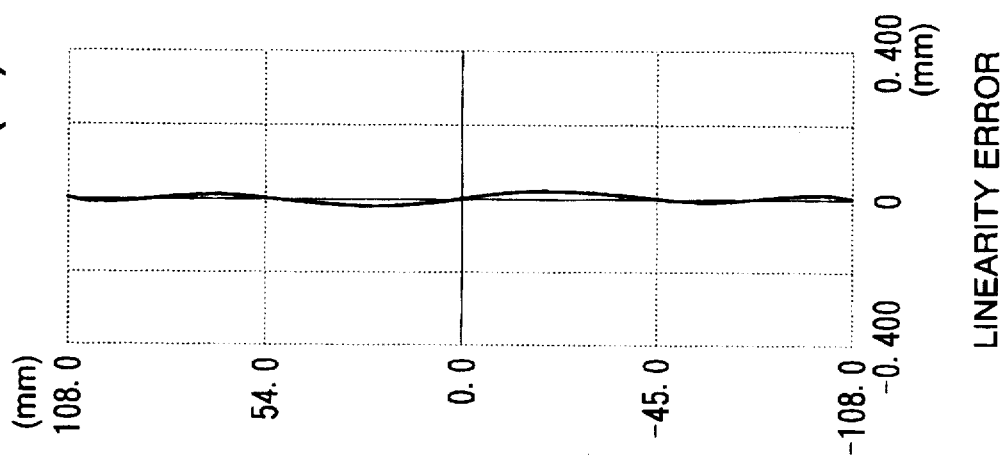

FIGS. 4(A) and 4(B) show the linearity error and the curvature of field (M: Main scanning directions, S: Auxiliary scanning direction) respectively. The vertical axis represents the height on the object surface and the horizontal axis represents the amount of aberration. The units for the axes are millimeters.

As described above, since the scanning optical system of the present invention is designed such that the linear image, which is an object point of the second imaging optical system, is disposed between the polygon mirror and the imaging surface, the magnification of the second imaging optical system in the auxiliary scanning direction can be higher, and the focal length of the first imaging optical system can be longer, without an increase in the distance between the first imaging optical system and the deflector. Thus, the diameter of the aperture can be larger while keeping the predetermined beam spot size, such that the energy availability of the laser beam is increased.

The present disclosure relates to subject matter contained in Japanese Patent Application No. HEI 08-42059, filed on Feb. 5, 1996, which is expressly incorporated herein by reference in its entirety.

What is claimed is:

1. A reflection type scanning optical system that forms scanning lines on an imaging surface, said system comprising:

a light source that emits a light beam;

a deflector for deflecting and scanning the light beam emitted from said light source;

a first imaging optical system, between said light source and said deflector, that has a positive power in an auxiliary scanning direction for converging a light beam from said light source to form a linear image at a position between said deflector and said imaging surface; and a second imaging optical system that converges said light beam deflected by said deflector to form a beam spot on said imaging surface, said second imaging optical system including a curved surface mirror having a positive power mainly in a main scanning direction and an anamorphic lens having a positive power mainly in said auxiliary scanning direction, wherein said light beam from said deflector is reflected by said curved surface mirror and is then transmitted through said anamorphic lens.

2. The reflection type scanning optical system according to claim 1, wherein said deflector comprises a polygon mirror, which has a plurality of reflecting surfaces, that is rotated for scanning said light beam.

3. The reflection type scanning optical system according to claim 2, wherein said first imaging optical system includes a cylindrical lens that has a positive power only in only said auxiliary scanning direction.

4. The reflection type scanning optical system according to claim 3, wherein said power of said cylindrical lens satisfies a condition:

$$0.1P<L<0.9P$$

where P is a distance between said reflecting surface of said polygon mirror and said curved surface mirror along an optical axis, and L is a distance from said reflecting surface of said polygon mirror and said linear image.

5. The reflection type scanning optical system according to claim 3, wherein said first imaging optical system further includes an aperture that limits a transmitted area of said light beam.

6. The reflection type scanning optical system according to claim 1, wherein said polygon mirror and said curved surface mirror are arranged such that the incident light beams and the reflected light beams are separated from one another in said auxiliary scanning direction.

7. The reflection type scanning optical system according to claim 1, wherein said curved surface mirror comprises a plastic body and a reflective coating applied to said plastic body.

* * * * *